United States Patent

[11] 3,618,000

| | | |
|---|---|---|
| [72] | Inventor | Henry T. Carruth, Jr.<br>Houston, Tex. |
| [21] | Appl. No. | 874,668 |
| [22] | Filed | Nov. 6, 1969 |
| [45] | Patented | Nov. 2, 1971 |
| [73] | Assignee | Chevron Research Company<br>San Francisco, Calif. |

[54] SYSTEM FOR GENERATING AND TRANSMITTING A POSITION IDENTIFICATION CODE TO IDENTIFY GEOPHONE LOCATION AND METHOD OF USING SAME
15 Claims, 11 Drawing Figs.

| | | |
|---|---|---|
| [52] | U.S. Cl. | 340/15.5 DP |
| [51] | Int. Cl. | G01v 1/00 |
| [50] | Field of Search | 340/15.5 DP |

Primary Examiner—Rodney D. Bennett, Jr.
Assistant Examiner—Joseph G. Baxter
Attorneys—A. L. Snow, F. E. Johnston, G. F. Magdeburger, R. L. Freeland, Jr. and H. D. Messner ABSTRACT: A binary position code—preferably an 18-bit binary digital code—is generated by means of a multicontact, compact geophone switch interconnected between an encoder and a series of geophones positioned at the earth's surface. In a preferred embodiment, a 7-bit subcode identifies the marker position of at least one lead or marker geophone of the series of geophones; while two 5-bit subcodes identify the gap spacing between two subsets of geophones, if any, should the seismic prospecting crew employ split spread shooting techniques. (In split spread shooting, two groups of geophones are separated by an in-line distance centered at the location of the energy source.) The 18 bits of information are then combined with three bits of control data. The result—a 21-bit digital word—is then recorded on magnetic tape on the header section as header information. To indicate gap spacing, the tape can be processed in a manner directing the subtraction of one 5-bit code from the other 5-bit code, the difference appearing in decimal notation on the data printout.

INVENTOR
HENRY THOMAS CARRUTH, JR.
BY Harold D. Messell
Ralph L. Freeland Jr.
ATTORNEYS

SYSTEM FOR GENERATING AND TRANSMITTING A POSITION IDENTIFICATION CODE TO IDENTIFY GEOPHONE LOCATION AND METHOD OF USING SAME

This invention relates to field recording of multiple seismic signals in digital form and, more particularly, to generating position identification codes, in multibit binary form, from an encoder onto a header record section of a magnetic field tape in a format intelligible to i. a special purpose digital computer or
ii. a properly programmed general purpose digital computer.

SUMMARY OF THE INVENTION

In accordance with the present invention, a binary position code —preferably an 18-bit binary digital code—is generated by means of a multicontact, compact geophone switch interconnected between an encoder and a series of geophones positioned at the earth's surface. In a preferred embodiment, a 7-bit subcode identifies the marker position of at least one lead or marker geophone of the series of geophones; while two 5-bit subcodes identify the gap spacing between two subsets of geophones, if any, should the seismic prospecting crew employ split spread shooting techniques. (In split spread shooting, two groups of geophones are separated by an in-line distance centered at the location of the energy source.) The 18 bits of information are then combined with 3 bits of control data. The result—a 21-bit digital word—is then recorded on magnetic tape on the header section as header information. To indicate gap spacing, the tape can be processed in a manner directing the subtraction of one 5-bit code from the other 5-bit code, the difference appearing in decimal notation on the data printout.

In the apparatus aspects of the present invention, the geophone position encoding switch includes: (1) first receptacle means having B pairs of switch contacts adapted to be connected to a series of active geophones lying along the earth's surface and B marker contact means having an ordered association with said B pairs of switch contacts. The receptacle can be connected to a rather large number of geophones, say where B can be as large as 104; (2) first plug means having C pairs of switch contacts adapted to be closed in contact with a subgroup of said B switch contacts of said receptacle means for the purpose of transferring, in operation, seismic signals, and a single marker means adapted to be closed in contact with one of said B marker contact means of said receptacle means. The number of switch contacts of the plug means is preferably less than that of the receptacle means, say where C is equal to about 72; (3) matrix encoding and gating means connected between the marker means of said first receptacle and said first plug means for producing and storing a multibit binary code associated with at least one marker position of said plug and receptacle means, and (4) decoding means for enabling said matrix encoding and gating means in a time-dependent gating sequence so as to allow combination of said multibit binary code with separate control bits of information to form a magnetically recordable binary digital word intelligible to a special purpose, or properly programmed general purpose, digital computer. The receptacle means preferably includes an indexing scale (color coded) to aid the operator in his adjustment of the plug means from position to position along the receptacle means.

BACKGROUND OF THE INVENTION

Geophysical prospecting has found widespread application in the search for petroleum. Generally, a source of seismic energy (such as an explosive charge placed in a shallow borehole or, of more recent origin, a hydraulically actuated vibrator placed at the earth's surface or other types of repetitive nondynamite energy sources) is initiated at a point near the surface of the earth.

Seismic waves propagate downward into the earth from the source. As discontinuities in the earth formation are encountered, a portion of the propagating waves is reflected back to the surface of the earth where detection, by means of a series of geophones, occurs. The detected waves are translated by the geophones into a series of electrical signals. These signals are then recorded by means of a magnetic tape unit interconnected to the geophones through associated circuitry which usually includes a rollalong switch. In conventional analog seismic collection equipment, the associated circuitry operates in a straight forward manner. On the other hand, in digital field recording equipment (of more recent origin due to the availability of general and special purpose digital computers for processing the resulting seismic data) not only must the detected analog seismic signals first be multiplexed, but also they must later be converted to a digital format compatible with computer processing before recording.

In normal multiplexing and conversion, at least 12 binary bits are needed to define a number representing the amplitude of the analog seismic signal at a given point along the time base. Points along the time base, of course, must be sampled in sequence. The binary bits of information are recorded on the data record section of a seismic record in time sequence related to the sampling rate of the analog seismic signal. The resulting records are then processed—enhanced—using preconceived statistical and logic theories as generated and performed by digital computers usually located at a central location remote from the field. Among the mathematical and statistical processing techniques normally used at the computer centers is a process known as "common depth point stacking." In CDPS, associative seismic signals, in digital form, (i.e., binary bits associated with common subsurface reflection areas) are combined so as to enhance primary seismic events in the records while attenuating noise and secondary (multiple) events. The associative character of the processing requires that the data be collected, in the field, in a manner that provides subsurface coverage of the same area many times, as obtained using the so-called "rollalong" field collection technique.

(In the rollalong technique, a first record is made with the seismic source and geophone spread positioned at a first series of locations, then a second record is made with the source advanced a certain in-line distance relative to the geophone spread. The geophone spread is advanced a similar in-line distance relative to a line of survey. By moving the source and geophone spread the same in-line distance, say the equivalent of twice the spacing between geophone stations, the resulting seismic information, in digital form, provides multiple coverage of the same subsurface area.)

In the rollalong technique, the geophone spread does not necessarily need to be physically advanced after each collection cycle. Relative geophone spread movement can be changed, in a very rapid manner, using electromechanical switching techniques, as provided by the rollalong switch previously mentioned, connected between the geophone spread and the associative digital and recording equipment.

The operation of the rollalong switch—in digital field recording systems—is usually manually controlled by a seismic crew member to provide, in sequence, switching action analogous to advancing several geophone stations at one end of the spread to positions at the other end while the remaining geophones are stationary.

Construction of the switch is relatively unsophisticated: a receptacle board having a large number of embedded receptacles connected to groups of geophones through conductors, is used in conjunction with a manually movable rollalong plug. As the plug is manually moved, from position to position along the receptacle board, selected subgroups of geophones are connected to the digital and recording equipment. At each position of plug-board connection, the seismic source is energized. The resulting return seismic signals are received at given sets of geophones and then digitized and recorded in digital form.

It is evident that changing the rollalong plug from position to position on the receptacle board can represent quite a large change in the actual field position of the geophones. For example, in a geophone spread including 48 separate geophones spaced 330 feet apart (a three-mile spread), each step in the switching cycle "advances" the spread a distance of roughly 660 feet. Thus, if the seismic crew's rollalong switch operator misadvances the rollalong plug along the board, the resulting seismic data will not be correctly annotated positionwise. Accordingly, such data, if later processed using CDPS, will provide algebraic summed results which in reality do not relate to common subsurface reflection areas. What is recorded as being related to a particular geographic area may actually relate to an area displaced a substantial distance along the line of survey. Further, positional errors are retained in the record irrespective of the final form of display. For example, the final display can be in analog format (by converting the digital form of the data to an analog form after processing). The resulting record profile gives the appearance of a group of traces recorded side by side using a series of in-line geophones coincident with a vertical plane through the line of survey. However, if the seismic data, as collected, is incorrectly annotated, positionwise, the errors are still retained in the final record profile. Combined traces indicated as being related to a particular set of geophone locations—in profile—may actually be directly associated with other sets of geophone locations scattered varying distances from the recorded positions.

It is an object of the present invention to provide a method and apparatus for encoding, on the header section of a seismic record, a binary identification code which relates, ultimately, to the identification of relative and absolute geophone station locations associated with a given seismic data collection cycle while simultaneously providing for multichannel transfer of seismic data from a plurality of geophones to a multiplicity of switchable output data channels connected to digitizing and recording field equipment.

Although field recording devices have been suggested for encoding, in binary form, identification information related to various field collection parameters, such as reel number, record number, filter settings, amplifier gain, etc., no device has been provided which is capable of producing a binary identification code, on a recording medium, related to marker positions of at least one geophone of the geophone spread during each collection cycle.

DETAILED DESCRIPTION OF SPECIFIC EMBODIMENTS

Figure 1:
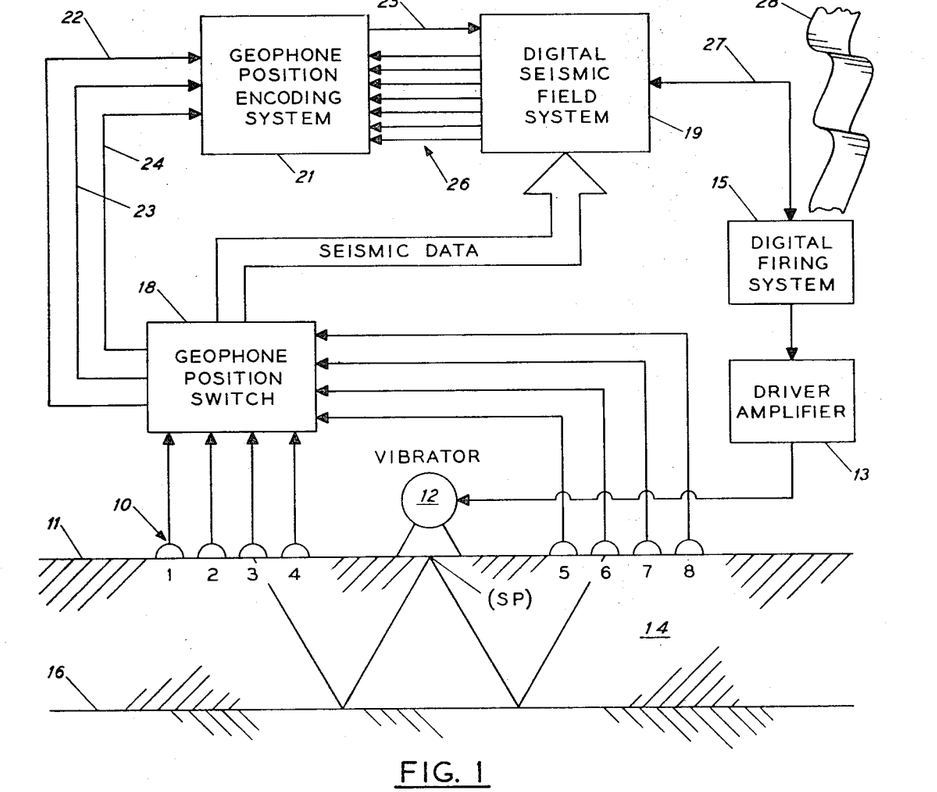
FIGS. 1 and 1a are functional block diagrams illustrating the systematic collection, recordation, and coding of seismic data in binary form using a conventional "rollalong" field collection technique.
Figure 1A:
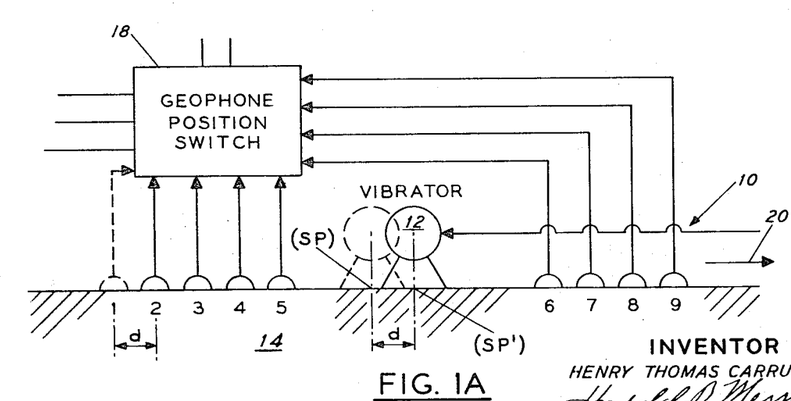

Attention is now directed to FIGS. 1 and 1a illustrating the method of the present invention. As shown, a geophone spread 10 comprising geophones 1, 2, 3...6, 7, 8 are positioned in contact with the earth's surface 11. Located midway along the geophone spread 10 is a hydraulic vibrator 12 operatively connected to a driver amplifier 13.

Vibrator 12 is preferably a hydraulic type vibrator such as provided in a vibroseis system, a trademark of the Continental Oil Company, and provides for the initiation of a controlled seismic energy signal for transference into the earth formation 14 at source point (SP). The seismic signal imparted into the earth formation is in accordance with a predetermined variation (amplitude-versus-time) of a pilot signal obtained from digital firing system 15 in a conventional manner. After the vibrator has been initiated during a first collection cycle, reflections of the seismic energy, such as from discontinuity 16, are detected at the geophone spread 10. The analog output of each geophone is fed through geophone position switch 18 to digital field system 19 where, as explained in more detail below, amplification, multiplexing, analog-to-digital conversion and recording of the seismic data occur.

After the vibrator has been operated at source point (SP), the vibrator as well as the geophone spread 10 may be displaced to new positions as illustrated in FIG. 1a during a second collection cycle. As shown, vibrator 12 (solid line) is located at source point (SP') displaced in the direction of arrow 20 an in-line distance (d) from its previous location, source point (SP). (In FIG. 1a, the vibrator at source point (SP) is shown in phantom line.) The geophone spread 10 is advanced the same in-line distance (d), say where d is equal to the spacing between geophones. The spread 10 (comprising geophone stations 2–9) is now connected to the geophone position switch 18 to establish a new field geometry which, as commonly known, provides for multiple coverage of the same subsurface area of the earth formation 14.

Geophone spread 10 commonly comprises many times the number of geophones depicted in FIGS. 1 and 1a. For example, geophone spread 10 may comprise 104 separate geophone stations connected to geophone position switch 18 so as to cover a large in-line distance as measured from the ends of the spread. Spread lengths of 3–6 miles are not uncommon. As new geophone-source geometries are established during each collection cycle, the spread 10 does not need to be physically advanced to establish the new geometries. The relative geophone spread movement can be changed using the geophone position switch 18 which switches contact elements between subgroups of the geophone spread 10 in a manner analogous to the advancing of one or more geophone stations at one end of the spread to the other end while the remaining geophones are positioned as before.

However, the conventional rollalong switch is usually constructed so that switching is achieved by manual movement of one or more plugs from position to position along the receptacle board. (For split spread shooting, geophones adjacent to the location of the source are not connected to the recording unit; this is usually accomplished by using a split plug construction so that an incremental group of receptacles are "skipped" as the plug position is changed, thereby establishing a gap distance between active groups of geophones during each collection cycle.) Due to the large number of possible switch contact pairings available when ultralong geophone spreads are used in the collection of seismic data, experience has shown that misplacement of plug positions relative to the receptacle board can occur with frequency. For example, the operator might err in his positioning of the plug relative to a receptacle board during the second recording cycle depicted in FIG. 1a. Where geophones 2–9 of the spread 10 are supposed to be connected to the recording unit during the second collection cycle, the operator could have connected a new group of geophones to the recording unit, say geophone groupings beginning at the geophone station 4 of FIG. 1a. Thus the final processed data would be incorrectly associated with the geophone spread-source geometry of FIG. 1a while, actually, the true spread-source geometry was displaced to the right, as viewed.

To accomplish encoding of one or more marker positions of geophones within the geophone spread 10, the present invention provides for geophone position switch 18 which includes a plurality of marker indicating elements whose operation is explained in more detail below. These elements are operatively connected to a geophone position encoding system 21 through a plurality of conductors generally indicated at 22, 23, and 24. Due to the complexity of recording in digital form, the digital output of geophone position encoding system 21 is carefully synchronized with other operations of the digital seismic field system 19 as well as the operation of the digital firing system 15 through a plurality of conductors indicated at 26 and 27. Usually the digital output of encoding system 21 passes by way of conductor 25 for recording at the digital seismic field system 19 at magnetic tape 28 prior to the energization of the vibrator 12 by the digital firing system 15.

It should be noted that the method of the present invention is designed to be incorporated into digital seismic field systems and digital firing systems conventionally used in collecting digital form of seismic information such as provided by the Texas Instruments Company, Inc., Dallas, Tex. Only portions of that system pertinent to the present invention will be discussed in detail; i.e., the portion of the system related to the timing logic for incorporating the binary code identification of geophone positions onto magnetic tape will be discussed. Coordination of operations between the digital firing system 15 and the digital seismic field system 19 can, of course, be achieved in many ways, for example as shown in U.S. Pat. No. 3,416,631, "Digital Remote Firing System," John D. Patterson.

Figure 2:
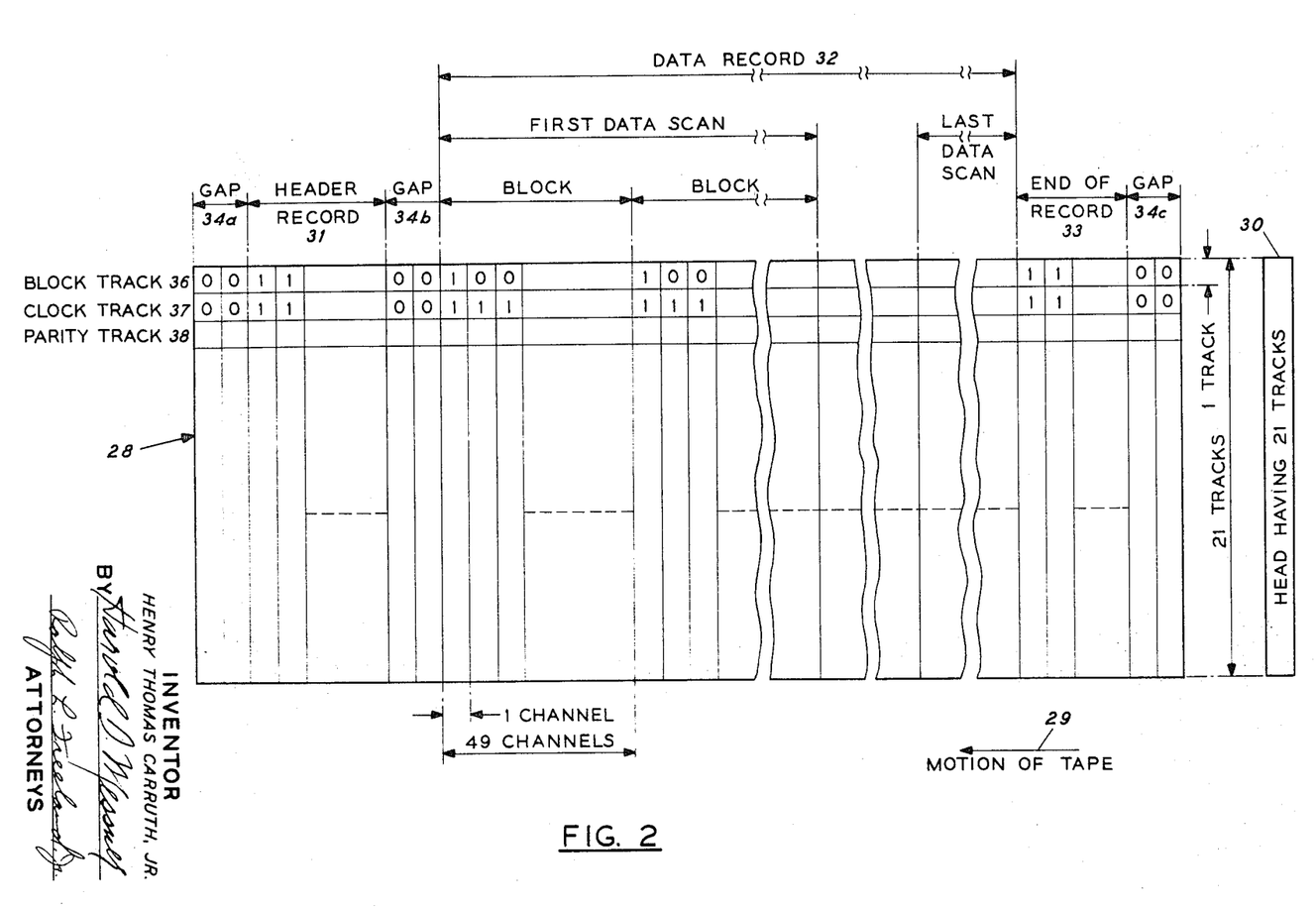
FIGS. 2 and 3 are schematic representations of the positioning of binary seismic information on magnetic tape as produced by the method of FIG. 1.
Figure 3:
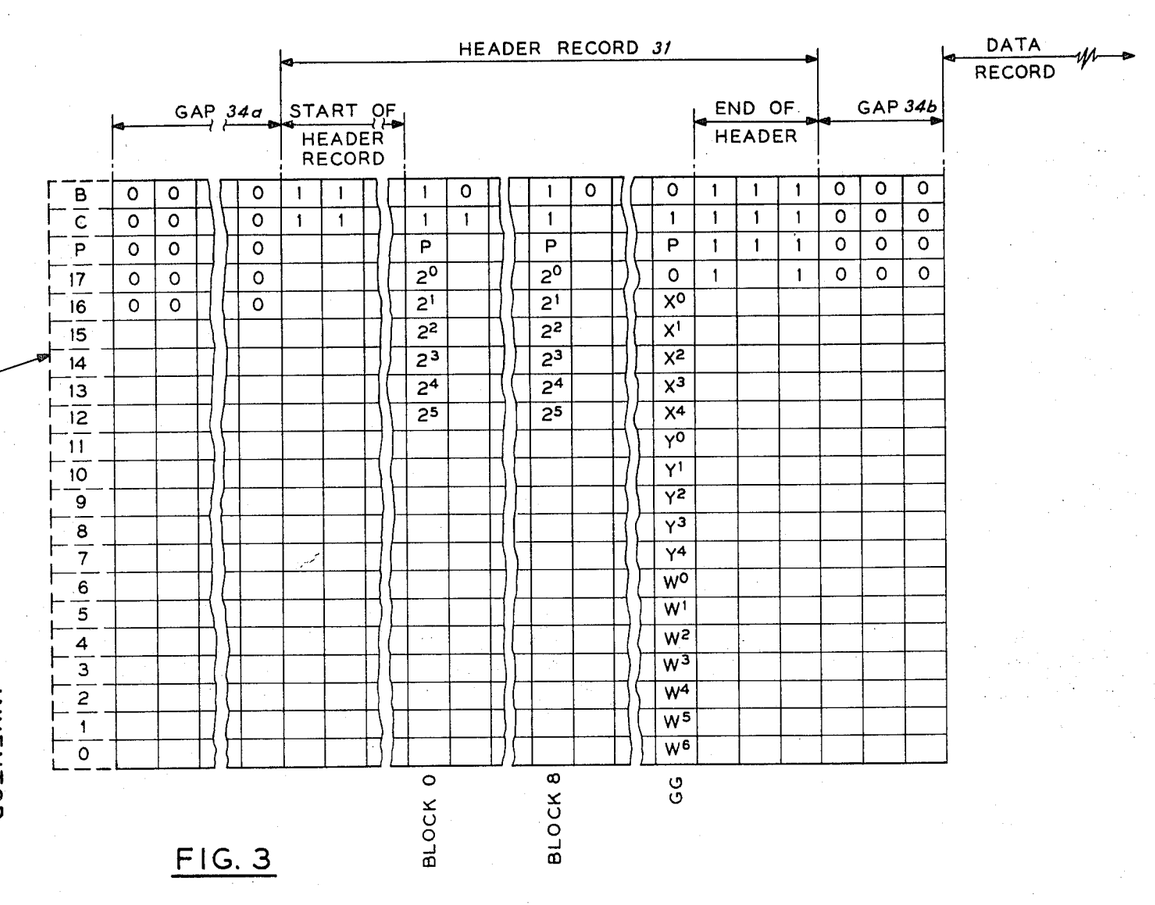

Timing logic for controlling the recording, positionwise, of bits of information associated with geophone locations can be illustrated by observing the format of the recorded binary information on magnetic tape 28. Briefly, as shown in FIGS. 2 and 3, code identification associated with relative and absolute positions of geophones in the geophone spread during collection are recorded in binary form on magnetic tape 28 at the header record section 31.

Primary requisite of the selected format: It must be compatible with later processing by digital computers. Further, since the computer basically manipulates and processes data based on data character length divided into "words" and "blocks," the magnetic tape formats of FIGS. 2 and 3 are likewise organized. In FIG. 2, for example, a conventional 21-track magnetic tape format is arranged in a series of tracks arranged across the width of the tape, and in a plurality of channels arranged along the length of the tape. Motion of the tape is in the direction of arrow 29. Transfer of data to the tape is accomplished by a 21-track head unit 30 positioned at the right-hand side of FIG. 2. Indications of specific sections of data along the longitudinal length of the tape divide each record into header section 31, a data record section 32, and an end-of-record section 33. Within the data record section 32 the data is further organized into a series of data sections as indicated.

Along the width the series of tracks include the following: 18 data tracks and 3 control tracks. The control tracks comprise block track 36, clock track 37 and parity track 38. Further, one of the data tracks, say the 0 track, can be utilized, sequentially, for control purposes, viz, to indicate the sign (±) of the channel.

The block and clock tracks 36 and 37 are used to record block pulses and clock pulses, respectively. A block pulse is generated at the dividing point between each two data blocks and thus distinguishes the data blocks which follow. The block pulses are recorded by continuously magnetizing the block track 36 in one direction by means of the head unit 30. To establish the ONE state, the block track 36 is magnetized continuously at the start of the record, the end of the record, and for each block address word. Where data words are inserted into the record after the block address, no pulses are recorded within the block track 36 (ZERO state).

A clock pulse is generated at clock track 37 at each channel for all data words. Where a gap appears in the record, say at gaps 34a, 34b, 34c, the data bits on block track 36 and clock track 37 are in the ZERO state. At the start of each block of data, except for the zero block address (remaining channel tracks are in the ZERO state), the address is signified by means of $2^0$ to $2^N$ orders of binary bits which can appear in the 18 data channels.

The parity track 38 is used to record a parity pulse which serves as a check of the efficiency of the transfer of the seismic data to the magnetic tape. All information within one data channel should add up to either an odd or even number which can be checked with the parity signal provided within each parity track 38. For example, for the data tracks 1, 2...18, a parity pulse ONE will appear if these data tracks contain an even number of ONE's.

Gaps 34a, 34b and 34c have previously been indicated by means of ZERO states at the block and clock tracks 36 and 37 for all channels comprising the gap. Gap 34b is seen to be positioned between header record section 31 and data record section 32.

Within the data record section 32, each channel is divided into one 18-bit word and 3 control bits, as previously mentioned. The number of blocks required to provide a seismic data record varies with the amount of fixed information which is provided to the head 30. For example, a 6-second analog signal received at the geophone spread 10 of FIG. 1 and sampled at 0.002-second intervals, digitized and then recorded, will have 6/0.002 = 3,000 blocks of data arranged along the longitudinal length of the magnetic tape.

Within each data scan, the first channel of each block is referred to as the block word. The block word, as previously mentioned, specifies the elapsed time from block zero (time break - so called ) and identifies the channel as a block word in the form previously mentioned. Block words, for example, for 0.002 second sample interval will be in sequence 0,2,4,6, 8, 10, etc. (octally). The remaining number of channels in each block are referred to as data words and, in length, are equal to a constant number, say 30, not of course, including block word. The seismic data is located within each data channel in, say, the most significant 13-bit positions of each 18-bit word. The remaining bits of each data channel provide for recording of binary amplifier gain indications (4 bits) as well as the sign indication (1 bit).

As will be explained in more detail below, binary gain amplifiers are used to amplify the signal provided each geophone of the geophone spread 10 of FIG. 1. The intensity of these signals received by the geophone spread and amplified by the binary gain amplifiers, varies over an extremely large dynamic range. To avoid overloading the binary gain amplifier, the gain must be varied in accordance with the amplitude of the received signal. The gain of each amplifier is indicated by the binary amplifier gain indications (4 bits) mentioned above.

FIG. 3 depicts the header section 31 in more detail. Along the left-hand side as viewed in FIG. 3, tracks 0 to 17 are illustrated related to the 18 data channels while the control channels $b$, $c$ and $p$ relate to the block track, the clock track and the parity track, respectively. At the start of the header record, block track and clock track $b$ and $c$ are coded with a "ONE" stored as shown. Within the remaining data tracks, the sign number, reel number, geographic location can be inserted in alphanumeric form. Beginning at block address "0," various conventional instrument settings are applied to the tape, such as the amount of amplification set into each binary gain amplifier (initial gain) as well as the constant gain factor of the preamplifiers. Since modern seismic collection techniques employ a great number of individual binary amplifiers, the binary data identifying amplifier characteristics as well as filter characteristics can occupy a rather large block of data, say from block "0" to block "8" of the header section 31. Following the eight blocks of amplifier information in binary form, there are set aside two blocks of data to indicate the following data in binary form: serial number, instrument type, sampling rate, geophone spacing interval, record length, trip delay as well as a series of geophone position marking codes.

At channel (GG)—channel (GG) being identified with a particular word and block number of header record section 31—an 18-bit digital code identifies three separate subcodes for geophone position markings: $X^0...X^4$, $Y^0...Y^{subcode}$ and $W^0...W^6$. Each multibit digital subcode can be transposed as representative of a decimal digital number of a marker switch position of the geophone position switch 18 of FIG. 1. Each marker switch position, in turn, can be associated with particular geophone marking position.

$X^0...X^4$ and $Y^0...Y^4$ Subcodes

As previously mentioned, in producing different types of seismic field records it is often desirable to use a split spread shooting arrangement, especially where a hydraulically operated vibrator, such as vibrator 12 of FIG. 1, is positioned in-line with and adjacent to geophone spread 10. To disconnect key central geophones adjacent to the vibrator requires the use of a multicontact gap switch arrangement. As explained below, the present invention utilizes a position marking arrangement which identifies the end locations of the split spreads so as to identify "gap spacing" in relative terms.

The bit-characters $X^0...X^4$ are seen to be positioned on tracks 16, 15...12 of the magnetic tape 28; they transform a digital decimal position marking associated with a key geophone of one of the subgroups of the split spread into a binary subcode. For example, the bit-characters $X^0...X^4$ can present, in binary form, the position of geophone 1 of the geophone subgroup 1-4 of FIG. 1 offset in a first direction the greatest in-line distance from source point (SP). In a similar manner, the bit-characters $Y^0...Y^4$ on tracks 11, 10...7 identify the location of a key geophone of the other subgroup of the geophone spread 10 of FIG. 1, such as, for example, geophone 8 of the geophone subgroup 5,6...8 located the greatest in-line distance from source point (SP) in a second direction opposite to the first direction. Since the subcodes $X^0...X^4$ and $Y^0...Y^4$ are used to identify the amount of gap spacing between two subgroups of geophones, only the incremental of the binary readout of these two subcodes need be printed. (In this regard, it is common that the center gap readout is determined by taking the difference between the binary printout of the subcodes $X^0...X^4$ and $Y^0...Y^4$.

$W^0...W^6$ Subcode

As previously mentioned, the bit-characters $X^0...X^4$ and $Y^0...Y^4$ provide only relative geophone marking information identifying gap spacing, if any, between split geophone spreads. Bit-characters $W^0...W^6$, however, indicate an absolute decimal position of a key geophone of the entire geophone spread. The bit-characters $W^0...W^6$ are seen to be positioned on tracks 6, 5...0 of the magnetic tape 28.

Bit capacities for the subcodes $X^0...X^4$, $Y^0...Y^4$ and $W^0...W^6$ are determined by the precision required by seismic field collection processes. In field practice, it is not unusual to position at one time, 104 separate strings of geophones having, say, 24–36 geophones per string across the earth's surface. Thus, 104 separate decimal locations could possibly be designated as key geophone group locations during the rollalong collection of data utilizing the strings of geophones. Accordingly, a digital code ($W^0...W^6$) of seven orders is required. Similarly since each gap switch position is usually associated, in actual field practice, with a key surface location of a string of, say, 26 geophones, a 5-bit digital code ($X^0...X^4$ or $Y^0...Y^4$) is sufficient to indicate the first and second gap switch position.

The invention is not limited to a 21-format, however. Both a 9-track format and a 3-word, 7-track format could be used without departing from the intended scope of the present invention. In a 9-track format, 8 data tracks are utilized, numbered 0, 1, 2, 3, 4, 5, 6 and 7, and one parity track (P) is utilized. Each data value is contained, in each record channel, in one group of 8-bit characters called a byte. Accordingly, in a 9-track format, the three subcodes $W^0...W^6$, $X^0...X^4$ and $Y^0...Y^4$ would be recorded as three separate bytes of information. On 7-track format, 6-data tracks and one-parity track, are utilized. Accordingly, in a 7-track format, the three subcodes $W^0...W^6$, $X^0...X^4$ and $Y^0...Y^4$ would be recorded as three separate digital words.

FIGS. 4, 5, 6 and 7 illustrate the geophone position switch 18 of FIG. 1 in more detail.

Figures 4, 7:
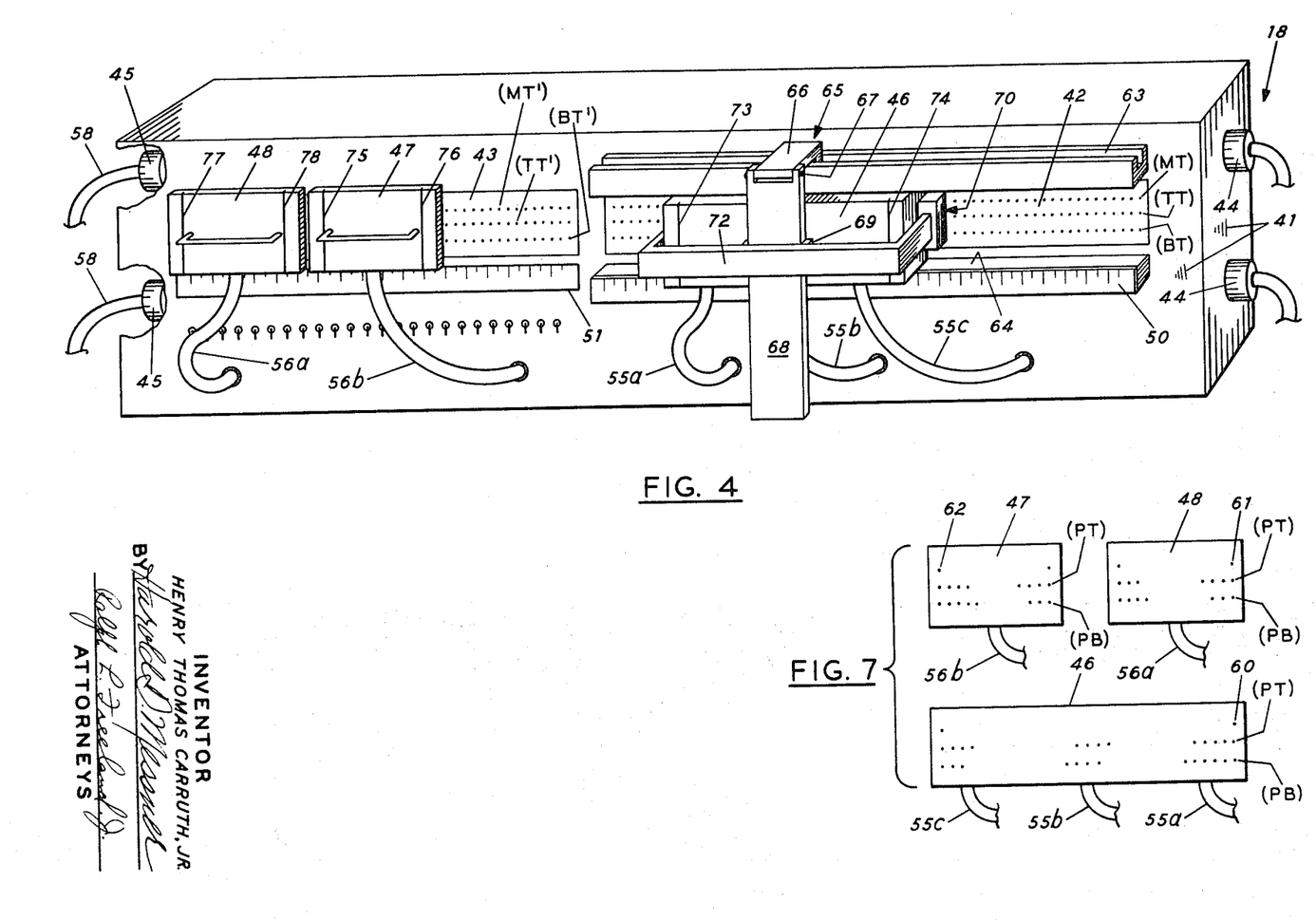
FIG. 4 is an isometric representation of a geophone position switch useful in the method of FIG. 1.
FIG. 7 is a detail of the manually movable switch plugs of the geophone position switch of FIG. 4.

As shown in FIG. 4, the geophone position switch 18 includes a stationary metallic housing 41 onto which has been mounted, on a front panel, two receptacle boards 42 and 43; mounted on separate side panels of housing 41 are a series of transfer cable connectors 44 and 45.

Figure 5:
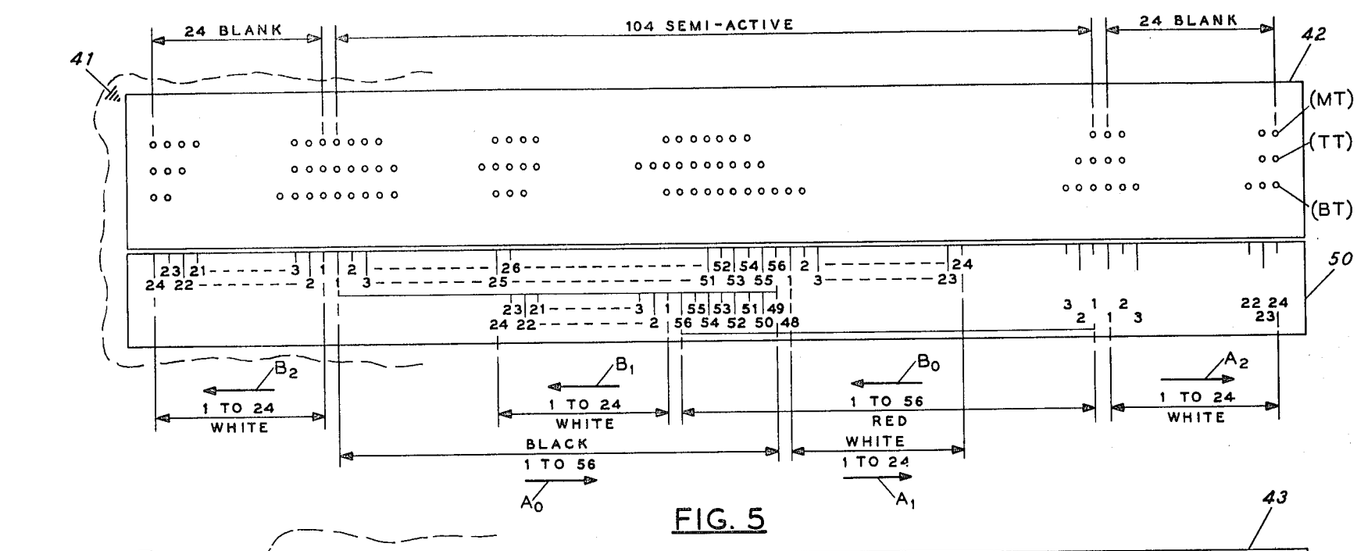
FIGS. 5 and 6 are details of the receptacle boards of the geophone position switch of FIG. 4.
Figure 6:
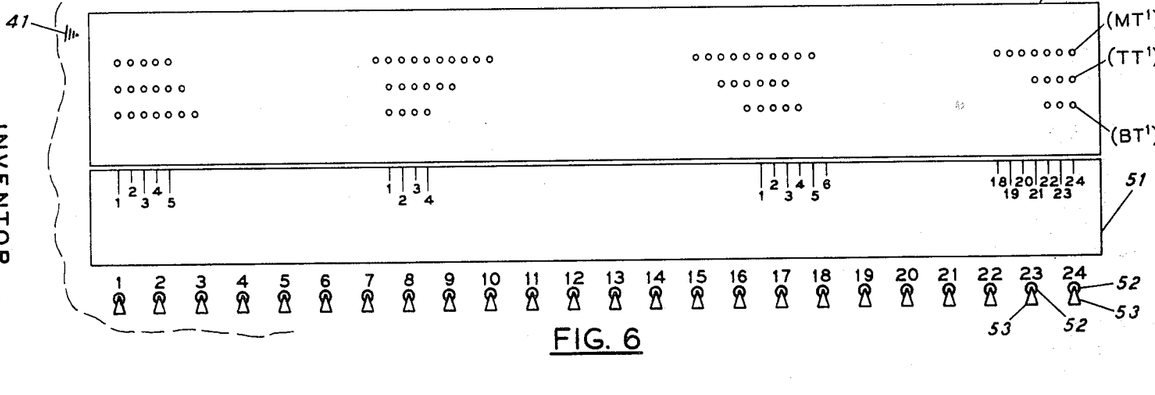

FIGS. 5 and 6 illustrate receptacle boards 42 and 43, respectively, in more detail. As shown in FIG. 5, rollalong receptacle board 42 (formed on an insulating material) contains three parallel rows of embedded metallic terminals: marker row (MT) and transfer rows (TT) and (BT). The individual terminals in rows (MT), (TT) and (BT) are aligned in columns perpendicular to the longitudinal direction of the rows. Across the front panel of the housing 41 (facing the operator), an indexing strip 50 is positioned on which are scribed arabic numbers to indicate the columnwise position of the marker terminals. Each arabic number refers to a particular column of transfer terminals in alignment, columnwise, with an individual marker terminal. Each column of transfer terminals—rows (TT) and (BT)—connect to the outputs of a particular geophone; thus each pair of aligned transfer terminals form a data transfer channel that is keyed, numerically, to a likewise numbered and positioned geophone station in the field.

Due to the large number of transfer and marker terminals embedded within the rollalong board 42 (it is not unusual to have over 152 columns of active transfer terminals), the arabic numbers may be color coded to form a series of visual legends. For example, at the left-hand and right-hand end segments of the indexing strip 50 (as viewed in FIG. 5) a number of columnar mounting terminals are indicated by a basic color code, say white. The white coded legend is used to indicate that the terminals in rows (TT) and (BT) are "blanked" terminals, i.e., they are not connected electrically to field geophones. Across the midportion of the receptacle board 42, a large segment of separate columns of transfer terminals, say 104, are color tagged by black and red legends to indicate that they are connected to field geophones, i.e., are "active" terminals. Beginning at the left-hand side of the receptacle board, the black legend defines a first subgroup of paired columns of transfer and marker terminals, beginning at the arabic number "1" lettered in black, proceeding in the direction of arrow $A_0$ and ending at the arabic number "56" positioned towards the center of the indexing strip 50. A second subgroup begins at the column next to the arabic number "56" (black) and is indicated by the arabic number "1" lettered in a color code matching that used to identify the "blanked" terminals at the ends of the receptacle board 42, i.e. white. The second group terminates at arabic number "24" (white) in the direction of arrow $A_1$. The "white" code indicates that connection between an appropriately constructed rollalong plug (say having 48 active columnar pin capacity) and the rollalong receptacle board 42 will include one or more of the "blanked" terminals at the right-hand side of the receptacle identified with arrow $A_2$, assuming the direction of plug movement is from left to right as viewed in FIG. 5, i.e., in the direction of arrows $A_0$, $A_1$, $A_2$. Thus, when the left column of pins of the plug, as viewed in FIG. 5, is connected to the terminals indicated by white legend character "1" as the plug proceeds from left to right, the opposite end of the plug will have one or more pins connected to the "blanked" terminals of the receptacle board 42 identified with arrow $A_2$.

The seismic crew operator may choose to change switch contacts of the switch 18 in a direction which proceeds from right to left as viewed in FIG. 5, in the direction of arrows $B_0$, $B_1$, $B_2$. A fourth subgroup of paired columns of transfer and marker terminals begins at arabic number "1" lettered in red, at right-hand side of the board proceeding in the direction of arrow $B_0$ and ending at arabic number "56" (red). Next to arabic number "56," a fifth subgroup begins at the arabic number "1" lettered in white identified with arrow $B_1$. The fifth subgroup is terminated at arabic number "24" (white).

FIG. 6 illustrates gap switch receptacle board 43 in more detail. The capacity of the gap switch mounting board 43 is matched to the pine capacity of the rollalong plug to be used in association with the rollalong receptacle board 42. Assuming the rollalong plug has a total 72-columnar pin capacity, there will be 72 columns of transfer terminals embedded within gap switch receptacle board 43. As shown, the columns of receptacles can be provided with a color code legend similar to that previously described. For example, the transfer terminals comprising rows (TT') and (BT') as well as marker row (MT') are aligned columnwise with arabic numbers lettered on indexing strip 51.

Not all of the transfer terminals in rows (BT') and (TT') are activated during each seismic collection cycle. As explained in more detail below, only two of the 24-member subgroups of terminals are used during a given collection cycle (assuming a 48-channel amplifier capacity in the digital seismic field system). The centrally disposed subgroup of transfer terminals have a further feature: Each column of transfer terminals within this subgroup is disconnectably connected through a series of toggle switches 52 each having a lever 53 which protrudes through the front panel of the housing 41. Geophones ultimately connected to the transfer terminals of the central subgroup then have the additional feature of being capable of being affirmatively disconnected and shorted out during each collection cycle. When split spread shooting is done, for example, the closing of the toggle switches 52 can prevent signal generation by the geophones placed adjacent to the seismic source. Thus, cross talk, i.e., cross coupling of the signals at the transfer terminals of the central subgroup and geophone damage due to proximity to the energy source, can be minimized.

Reference is now made to FIGS. 4 and 7 illustrating constructional features of rollalong plug 46 and gap switch plugs 47 and 48. Each plug 46, 47 and 48 contains two parallel rows of metallic connecting pins—rows (PT) and (PB)—having a constant pin-to-pin spacing appropriate for engagement with transfer terminals of the receptacle boards 42 and 43, i.e., terminals in rows (TT), (BT) and (TT'), (BT'), respectively. Within each plug, a series of conductors (not shown) connect to the individual connecting pins as follows: The conductors within rollalong plug 46 are wound into three separate cables 55a, 55b and 55c, which exit through the bottom panel of the plug. The conductors within plugs 47 and 48 are wound into cables 56a and 56b, which likewise exit from the bottom panels of the plugs. As shown in FIG. 4, the cables 55a, 55b, 55c, 56a and 56b then enter the central housing 41 through a front panel; cables 55a, 55b and 55c for connection to the receptacles of the gap receptacle board 43, cables 56a and 56b for connection through multicontact output cable connectors 45.

The number, columnwise, of connecting pins in rows (PT) and (PB) of rollalong plug 46 as well as gap switch plugs 47 and 48 are determined by a number of factors, including the channel capacity of the digital field equipment. A further factor affecting pin capacity relates to the requirement of providing sufficient gap spacing to a field geophone spread. (Gap spacing is provided by the relative longitudinal positions of the gap switch plugs 47 and 48 relative to each other and to the receptacle board 43.)

Where no gap spacing is provided, gap switch plugs 47 and 48 are positioned abutting one another in the manner depicted in FIG. 4. Where gap spacing is provided between appropriate subsets of geophones, the geophone orientation is reflected by having gap switch plugs 47 and 48 spaced apart from each other a predetermined number of arabic numerals associated with the gap distance of the geophone spread. It is assumed for purposes of illustration that a 48-trace printout is the desired format for display of the seismic data; therefore, a 72-columnar pin arrangement for rollalong plug 47 and a 24-columnar pin arrangement for each of the gap switch plugs 47 and 48 are preferred.

Cables 55a, 56a and 56b of FIG. 7 do not only convey analog signals from the geophone spread to field digital and recording equipment, but also include conductors for transferring geophone switch position information. In more detail, a single marker pin 60 on rollalong plug 46 and marker pins 61 and 62 on gap plugs 48 and 47, respectively, establish, during each collection cycle, switch junction points that actuate a matrix encoder, as explained below, to indicate geophone switch position in binary codes. Operation of the pins 60, 61 and 62 is analogous to the operation of an electrical data switch. When the connecting pin 60, 61 or 62 is inserted within the interior of one of the marking terminals in marker row (MT) of board 42 or row (MT') of board 43, a series of output paths to electric current within a matrix encoder are formed (either open or closed). The position of the closed connecting pin provides for encoding, in binary form, the position of the switch junction point at the encoder.

Not all of the metallic terminals of the marker rows (MT) (MT') of the receptacle boards 42 and 43 of FIG. 4 need to be individually connected to the encoder during operation. For example, if the rollalong plug 46 is to be operated in only one mode—either left-to-right or right-to-left movement—only a major portion of the terminals of the marker rows (MT) (MT') need be electrically connected to the encoder since the marker pins 60, 61 and 62 of the plugs 46, 47 and 48, respectively, are aligned at either the leftmost or rightmost column of connecting pins in alignment with rows (PT) and (BP).

In FIG. 4, the incremental movement of rollalong switch plug 46 relative to receptacle board 42 is assumed to be from left to right, as viewed. Further, the leftmost columns of the connecting pins of the plugs, 46 and 48 as viewed, are assumed to be aligned with the marking pins while the rightmost column of the connective pins, as viewed of plug 47 is aligned with its marking pin, i.e. the marking pins of plugs 46, 47 and 48 are aligned with grooves 73, 76 and 77, respectively. It is evident that for incremental movement from left to right, the position code is incremented; for movement in a reverse mode, VIZ, from right to left as viewed, the position code is decremented.

Due to the weight of the rollalong plug 46, mechanical leverage is necessary in order to provide the seismic operator with assistance in moving the plug 46 from position to position along the receptacle board 42. As shown in FIG. 4, mechanical leverage for plug 46 is achieved in accordance with the present invention by means of a pivotal lever arrangement 65 disconnectably connecting plug 46 relative to U-shaped upper rail 63 attached to a central housing 41. The weight of the rollalong plug 46 is supported by lower rail 64. The height of the rail 64 below terminal rows (TT), (BT) and (MT) of the board 42 establishes a constant reference plane for the plug 46. Connecting pins of the plug thus are in correct horizontal alignment for contact with the receptacle board 42.

Pivotal lever arrangement 65 is provided with a planar support 66 terminating at one end in an enlarged boss slidably attached within U-shaped rail 63. At the other end, the support 66 is pinned, by means of pin 67, to a vertical support bar 68. Support bar through attaches to bosses 69 at its midregion for providing pivotal contact between the support bar 68 and horizontal support bar 72, fixedly attached to the plug 46. Accordingly, even though bar 68 is pivoted as the plug 46 is withdrawn or inserted relative to receptacle board 42, the plug 46, itself, remains in a horizontal plane defined by the upper surface of rail 64. Release of the plug 46 relative to the receptacle board 42 can be enhanced by means of a plunger arrangement 70 including, at each side panel of plug 46, a housing into which is mounted a piston. Triggers (not shown) within the horizontal support bar 72 cause actuation of the plunger.

Rollalong plug 46 is usually moved, alone, from position to position relative to the receptacle board 42 to thereby establish multichannel transfer points for seismic data during each collection cycle. Gap switch plugs 47 and 48 usually remain stationary during the collection cycle. In some applications, however, the operator may conveniently combine incremental movement of rollalong switch plug 46 with incremental movements of gap switch plugs 47 and 48 to overcome geographical problems associated with collection of seismic data.

Incremental movement of either rollalong plug 46 and/or gap switch plugs 47 and 48 can be conveniently controlled using the indexing marks of indexing strips 50 and 51 in combination with indexing grooves positioned on the back panel of the plugs 46, 47 and 48. In more detail in FIG. 4, grooves 73 and 74 of rollalong plug 46 are vertically aligned with the leftmost and rightmost columns, respectively, of the connecting pins at the front panel of the plug 46. Further, the grooves 73 and 74 are preferably appropriately color coded to match the legends lettered on indexing strip 50. (I.e., groove 73 can be color coded black; and grooves 75 and 74 can be color coded red.) Similarly, groove 76 of plug 47 and grooves 77 and 78 of plug 48 can be aligned, vertically, with columns of connecting pins and also color coded to match the legends on indexing strip 51. During operations, the seismic operator can provide vertical alignment between the indexing marks so as to achieve accurate indexing movement of the plugs 46, 47 and 48 relative to receptacle boards 42 and 43, respectively.

Figure 8:
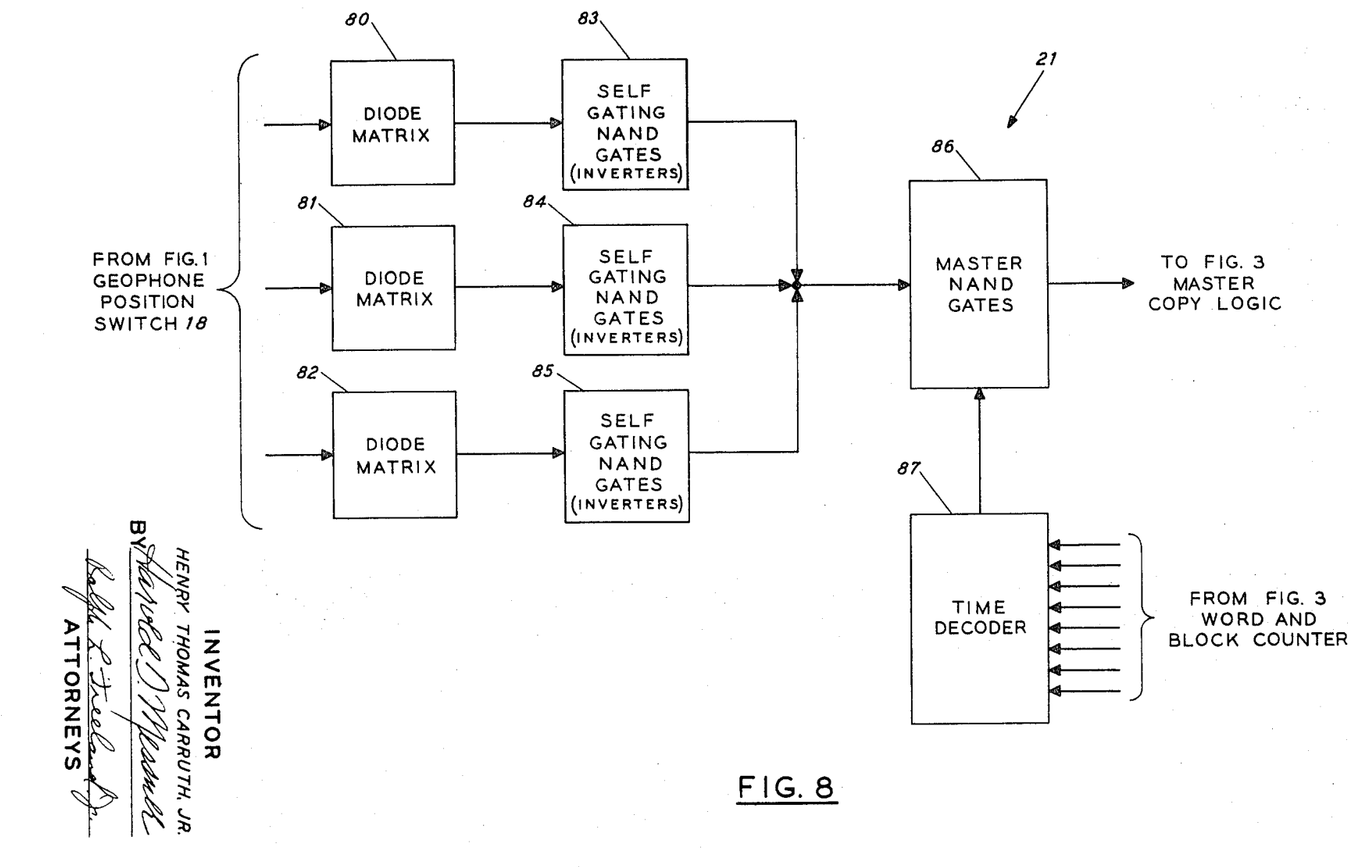
FIGS. 8 and 9 illustrate a geophone position encoding system useful in providing position encoding information onto a recording medium.
Figure 9:
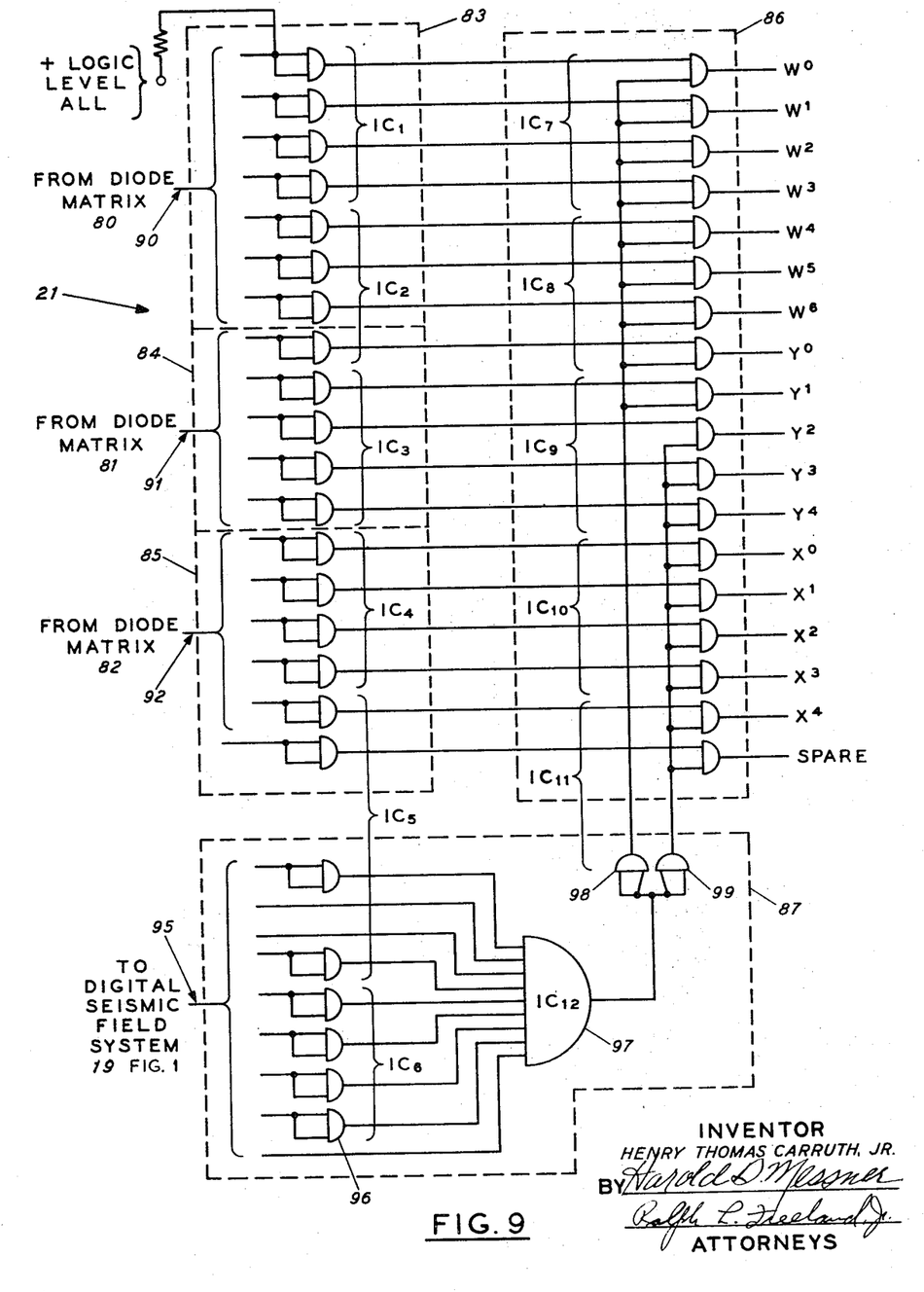

FIGS. 8 and 9 describe the geophone position encoding system 21 of FIG. 1 in more detail.

FIG. 8 is a schematic diagram illustrating the steps in the method of the present invention in which switch conditions within geophone position switch 18 of FIG. 4 are translated into binary codes. Binary code identifications are established in accordance with the present invention by means of diode matrices 80, 81 and 82; self-enabling NAND-gates 83, 84 and 85; and master NAND-gates 86. When switching points are established by connecting a marking pin of a plug within a particular marking terminal of a board receptacle—as previously mentioned—a series of output electrical paths are established through diode matrices 80, 81 and 82. The output of the diode matrices,—the binary code equivalent of the separate established switch points —serves as a partial enable to master NAND 86. The self-enabling NAND-gates 83, 84 and 85 serve as blocking circuits between the master NAND-gates 86 and the diode matrices 80, 81 and 82. Time decoder 87 causes the master NAND-gates 86 to be fully enabled to transfer the binary code information therefrom. The timing logic to insure proper transfer of the binary information at an appropriate word and block count is discussed in detail below.

FIG. 9 illustrates the operation of self-enabling NAND-gates 83, 84 and 85, master NAND-gates 86, and time decoder 87 in more detail.

As indicated, the binary information partially enabling master NAND-gates 86 is represented by an 18-bit code: $W^0...W^6$; $Y^0...Y^4$; and $X^0...X^4$; and a spare bit. The character of the 18-bit binary code is, of course, dependent upon the operation of diode matrices 80, 81 and 82.

As previously mentioned, the diode matrices 80, 81 and 82 each consist of a series of electrical paths. Usually each matrix is arranged into an arrangement of intersecting transfer arms which resemble grid lines of a rectangular coordinate system. At the intersecting points of the arms, normally nonconducting diodes connect to logic common through the switching points established by the operation of the geophone position switch 18 of FIG. 4. Each of the input arms of each matrix is usually an open circuit except When a switch point is established. Then a selected subset of diodes conduct so as to establish, at output arms 90, 91 and 92, a multibit binary complement output representing at least three separate switching conditions; $W^0...W^6$ (representing a rollalong switch position); $Y^0...Y^4$ (representing a first gap switch position); and $X^0...X^4$ (representing a second gap switch position).

As an example of the input to the master NAND-gate 86 consider the binary codes for rollalong switch position keyed to geophone position No. 51 (rollalong switch position 51); a first gap switch position keyed to geophone position No. 1: and a second gap switch position keyed to geophone position No. 48, but assuming complimentary logic is used, as previously described, the second gap switch position, in this example, would be described as switch position No. 1. It is evident that this example assumes there is no gap spacing in the geophone spread as shown, for example, in FIG. 4. The binary code provided by the matrices and associated logic circuitry would be as follows:

|  | $W^0$ | $WW2$ | $W^3$ | $W^4$ | $W^5$ | $W^6$ |
|---|---|---|---|---|---|---|
| (Binary) | 1 | 1 0 | 0 | 1 | 1 | 0 |
| (Decimal) |  | 51 |  |  |  |  |
|  | $X^0$ | $X^1X^2$ | $X^3$ | $X^4$ |  |  |
| (Binary) | 1 | 0 0 | 0 | 0 |  |  |
| (Decimal) |  | 1 |  |  |  |  |
|  | $Y^0$ | $Y^1Y^2$ | $Y^3$ | $Y^4$ |  |  |
| (Binary) | 1 | 0 0 | 0 | 0 |  |  |
| (Decimal) |  | 1 |  |  |  |  |

The most significant bit of the subcode $W^0...W^6$ is the $W^0$ bit; the most significant bit of the subcode $Y^0...Y^4$ is the $Y^0$ bit; and the most significant bit of the subcode $X^0...X^4$ is the $X^0$ bit.

Timing logic signals to fully enable master NAND-gates 86 are provided by means of timing decoder 87. Decoder 87 includes a series of input channels generally indicated at 95 connected to digital seismic field system 19 of FIG. 1; a series of self-enabling, NAND-gates 96; and a multi-input NAND-gate 97. Logic signals pass by way of NAND-gates 96 to enable multi-input NAND-gate 97 in a predetermined enabling sequence. The output of NAND-gate 97 is used to fully enable master NAND-gate 86 through NAND-gates 98 and 99 (logic inverters).

To construct self-enabling NAND-gates 83, 84 and 85, master NAND-gate 86 and time decoder 87, integrated network components are preferred. An integrated circuit using semiconductor materials can be miniaturized and formed on circuit boards (logic chips), and the circuit components assembled in the manner depicted in FIG. 9. As shown, the self-enabling NAND-gates 83, 84 and 85 comprise separate integrated circuits unitized in subsets of four; $IC_1$, $IC_2$, $IC_3$, $IC_4$ and a subpart of $IC_5$. Time decoder 87 comprises separate integrated circuits $IC_6$, $IC_{12}$ and parts of $IC_5$ and $IC_{11}$. Master NAND-gates 86 comprise separate integrated circuits likewise unitized in subsets of four: $IC_7$, $IC_8$, $IC_9$, $IC_{10}$ and a subpart of $IC_{11}$. Although the integrated circuits $IC_1...IC_{12}$ can be built from individual components and materials, it is preferable to purchase them, individually, from a reputable manufacturer of integrated circuits, such as the Texas Instruments Company, Dallas, Tex., and then assemble them together in accordance with the present invention.

Figure 10:
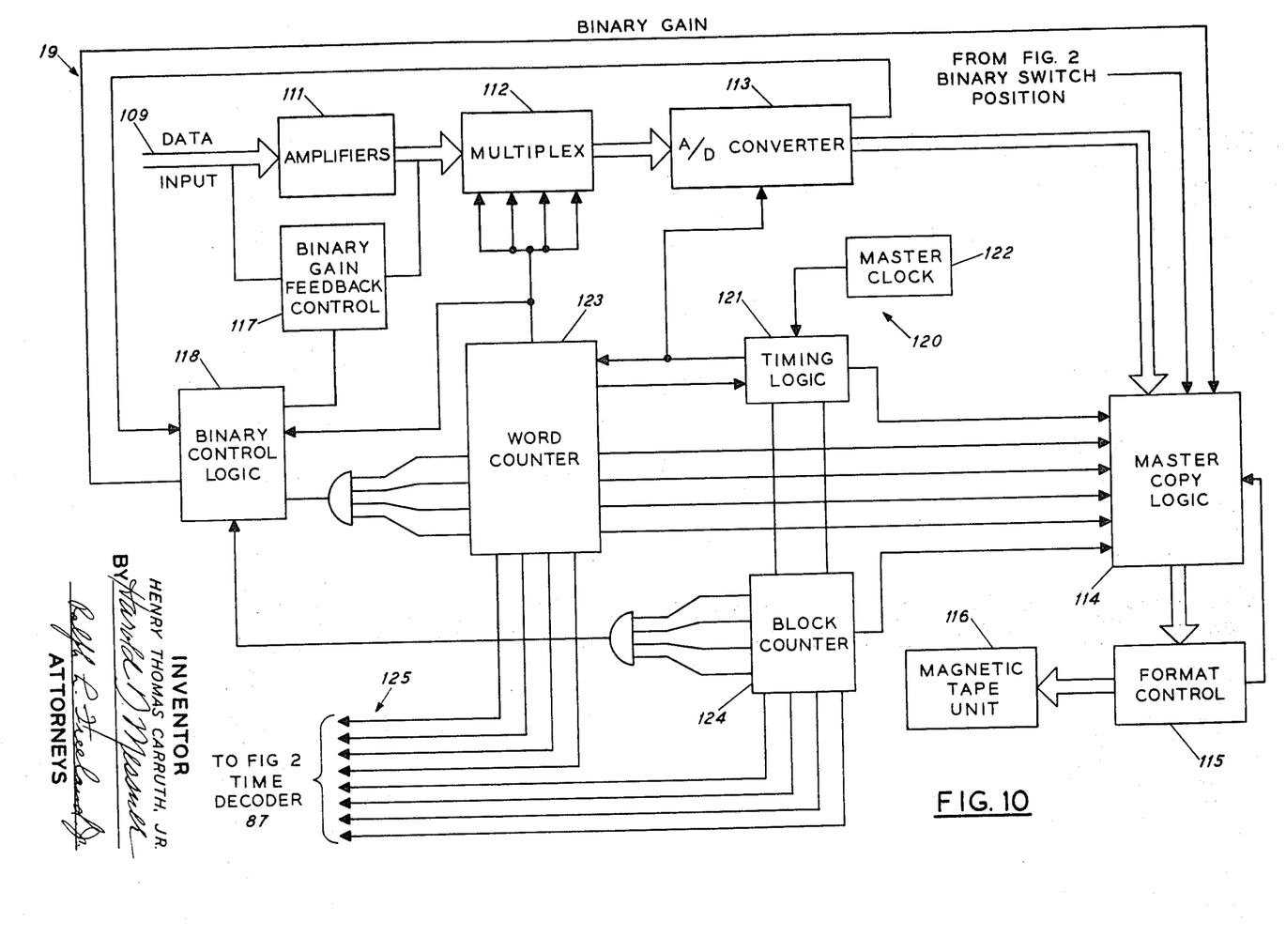
FIG. 10 illustrates, in function block form, the digital seismic field system of FIG. 1 for controlling the method of collection illustrated in FIG. 1.

FIG. 10 describes digital seismic field system 19 of FIG. 1 in more detail.

As shown in FIG. 10, the outputs from the field geophones enter the digital field system 19 via conductor means 109, thence through amplifiers 111, multiplexer 112, analog-to-digital converter 113, master copy logic circuit 114, format control circuit 115, and finally to magnetic tape unit 116. Binary gain shifts of amplifiers 111 are indicated by binary gain feedback. control circuit 117 through binary logic circuit 118 connected between the feedback control circuit 117 and the master copy logic circuit 114.

To provide word lengths and block lengths of data that are compatible with computer processing techniques, logic circuits 114 and 118 are carefully controlled for correct sequential operation utilizing a timing circuit generally indicated at 120. As indicated, timing circuit 120 includes a timing logic circuit 121 controlled by a master clock 122, and produces a series of timing (clock) pulses which are applied to logic circuits 114 and 118 through word counter 123 and block counter 124. The word and block counters 123 and 124 dictate, in conjunction with timing circuit 120, when the other groups of circuit elements must perform a preselected function. All operations are preferably performed in synchronism with the clock pulses (synchronous control). Each operation requires a certain number of clock pulses and, consequently, the timing to complete any one of the various operations is an exact multiple of the clock pulse. Thus, the readout of copy logic circuit 114 to magnetic tape unit 116 is accomplished at specific intervals of time that are exact multiples of the clock pulses. Further, the master copy logic circuit 114 can also be used to actuate other circuits, or other circuits can be caused to terminate simultaneously with its actuation.

Header Information Encoding

Initial binary gain settings are gated through master copy logic circuit 114, in correct time sequence, to permit digital recording onto the tape header section at magnetic tape unit 116. Timing logic circuit 120 in conjunction with word counter 123 and block counter 124 also provide enabling signals generally indicated at 125 which fully enable time decoder 87. As a result, binary switch position data—18 bit binary code—is passed through master logic circuit 114 and thence to magnetic tape unit 116 through format control circuit 115. Format control unit 115 may be provided with manual indexing circuitry in order to provide suitable binary information to the master copy logic circuit 114 during recording of header information. Although all header encoding activity is paced by signals from master timing logic circuit 120, during the header encoding activity, it is preferable that amplifiers 111, multiplexer 112, and analog-to-digital converter 113 remain in an inactive state. Usually master clock 122 is interrupted after header information has been placed onto magnetic tape at tape unit 116. Consequently, a gap is provided in the formatting of the tape record, in the manner previously discussed.

Seismic Data Encoding

After header information has been encoded, processing steps are carried out in sequence to record, in digital form, the seismic data onto magnetic tape. In more detail, at amplifiers 111, the amplitude of the data is determined using binary gain feedback control circuit 117. The binary gain of feedback control 117 is then gated through binary control logic circuit 118 to master copy logic circuit 114, in correct time sequence to permit its digital recording in the same channel as the binary seismic data. At multiplexer 112, the amplitude of each analog signal is electrically sampled, in sequence, over a plurality of very small time intervals—say, 0.002-second intervals. These signals, after being sampled, are transferred to analog-to-digital converter 113 where the digital results of the multiplexing operation are represented by a series of multibit binary code indications. The binary code information is electrically suited for storage on magnetic tape at magnetic tape unit 116 on the same channel as associated binary gain information. During all these steps, all activity is paced by regularly occuring clock signals from master clock 122. No event occurs within the entire system except at the occurrence of one of these clock signals or its multiple. In addition to block and word clock pulses, internal timing pulses are generated to cause transfer and manipulation of header and seismic data information such as at timing logic circuit 121 and master copy logic circuit 114. Thus, the output of copy logic circuit 114, for example, is accomplished at specific intervals of time which are exact multiples of the clock pulses produced by master clock 122. Other operations are caused to terminate simultaneously with the actuation of master copy logic circuit 114, while certain other circuits are being turned to a new state, signifying expiration of time for a preconceived, specified operation. As one subset of circuits is disabled, a new subset are enabled by timing pulses so as to perform new operational functions. The process (enabling some circuits, disabling others, in sequence) is repeated over and over.

Format control unit 115 is capable of manual changes during the seismic data encoding activity. In that way the format of the seismic data can be varied to meet new application requirements.

Magnetic tape unit 116 may be one of several commercially available types and should have the capability of recording seismic data in binary form onto magnetic tape.

Although the system described in FIG. 10 controls multiplexing and conversion of analog seismic data to digital data as well as to provide data in correct time sequences, additional circuitry can be inserted and combined with the system hereinbefore described to provide additional data-processing features, if desired. For example, not only could the data be moved and encoded in correct digital format onto magnetic tape, but also, arithmetic functions could be performed on the data prior to recordation. Sequencing of arithmetic functions could be in accordance with preconceived statistical and logic theorems well known in the computer processing art. Similarly, by use of computer technology, decisions (event picking) can be made prior to recording the enhanced data. In providing enhancement of the data, the sequencing of controlled instructions could be through the use of a separate instruction logic circuit (not shown). A separate storage unit associated with modern digital computers would also be needed.

While certain preferred embodiments of the invention have been specifically disclosed, it should be understood that the invention is not limited thereto as many variations will be readily apparent to those skilled in the art. For example, it is also apparent that the timing and logic circuitry hereinbefore described as utilizing synchronous control can also use asynchronous control without departing from the intended scope of the invention. As previously mentioned, in synchronous control, master clock 122 provides a source of all timing signals needed to provide recordation of data in digital form onto magnetic tape. All activity is paced by regularly occurring clock signals and no event, transfer or otherwise, occurs except at the occurrence of one of these clock signals. Between signals transient phenomena are allowed to decay. On the other hand, in asynchronous control, control steps are organized so that each event in the recording process is permitted to proceed at a rate which is governed by only the natural time constants of that event. All other events are interlocked so that no other may occur until the stated event has been completed. At that time, the completed event indicates its termination and invites the beginning of the next event. In either synchronous or asynchronous control applications, the circuitry to perform these functions is basically simple and, to a large extent, of four circuit types and combinations: the OR circuit which produces an output when one or more of its inputs are active; the AND circuit which yields an output only when all inputs are active; the flip-flop circuit which may be a multistable vibrator; and a converter circuit which yields a high output with a low input or vice versa. These circuits coordinate the operation of the entire system (viz, directing (VIZ, reading and recording of header format information: controlling multiplexing and conversion of seismic data to binary form; manipulating the transfer of information from location to location within the system).

I claim:

1. A method for generating marker positions of a geophone encoding switch disconnectably connectable to a series of active geophones, consisting of the steps of:

providing several recording tracks and channels along a magnetic tape so as to define, on said magnetic tape, a header record section, a data record section, and an end record section;

providing at least a multibit digital data indication related to an ordered rollalong switch position of switch contact means connectable to one of said active geophones, said one geophone marking the geographic location of said series of active geophones during a seismic collection cycle, providing another multibit digital data indication related to a first gap switch position of switch contact means connected to one of a first subgroups of said series of active geophones;

providing yet another multibit digital data indication associated with a second gap switch position of switch contact means connectable to one of a second subgroup of said series of active geophones, combining the multibit digital data indications with control bits to provide a digital word, and recording said digital word on several of said recording tracks along said magnetic tape at said header record section.

2. In the method of claim 1,
providing on said magnetic tape at least 21 tracks;
digitizing said marker switch positions of said switch contact means to provide, simultaneously, a 7-bit digital data indication related to said rollalong switch position, a 5-bit digital data indication related to said first gap switch position, and a second 5-bit digital data indication related to said second gap switch position, and
combining the 7-, 5-, and 5-bit digital indications with three bits of control data to provide a 21-bit digital word.

3. In the method of claim 1,
providing on said magnetic tape at least nine tracks;
digitizing, simultaneously, said marker switch positions of said switch contact means to provide a multibit digital data indication related to said rollalong geophone switch marker position, a second multibit digital data indication related to said first gap switch marker position, and a third multibit digital data indication related to said second gap switch marker position,
combining said multibit digital indications with control bits to provide at least three bytes of information,
and recording said bytes as at least one digital word at said header section of said magnetic tape.

4. In digitizing identifications codes, in binary form, on a header section of a magnetic tape to indicate absolute and relative position of a series of active geophones used in mapping, by seismic reflection techniques, an earth formation underlying said series of geophones,
a geophone position encoding switch disconnectably connected to said series of active geophones, comprising:
a rollalong switch receptacle comprising insulated support means and N-columnar, M-row receptacles mounted in and supported by said support means, each pin receptacle insulated from neighboring receptacles, each N-column of receptacles including a marker control pin receptacle and at least a pair of seismic transfer pin receptacles adapted to be electrically connected to the outputs of said series of active geophones,
a rollalong switch plug means including a support base and R-columnar connecting pins mounted to said support base where R is less than N, each R-column of connecting pins including at least a pair of seismic transfer pins adapted to connect to a particular N-pair of seismic pin receptacles of said rollalong switch receptacle, one of said R-columns of connecting pins including a single marker control pin adapted to connect to one of said marker control pin receptacles of said rollalong switch receptacle,
a gap switch receptacle comprising a support means and R-columnar, M-rows of pin receptacles mounted in said support means, each R-column of pin receptacles including a marker control pin receptacle and a pair of seismic transfer pin receptacles connected to an R-pair of seismic transfer connecting pins of said rollalong switch plug means,
first and second gap switch plug means having separate support bases and V-columnar connecting pins mounted in said support bases where V is less than R, each V-column of connecting pins including a pair of seismic transfer connecting pins adapted to connect to a particular R-pair of seismic transfer pin receptacles of said gap switch receptacle, each of two of said V-columns of connecting pins including a single marker control pin adapted to connect to one of said marker control pin receptacles of said gap switch receptacle, each of said two V-column connecting pins which includes a single marker control pin, being associated with one of said first and second gap switch plug means.
matrix encoding and gating means connected between said marker control pin receptacles and said rollalong switch receptacle and said single marker control pin of said rollalong switch plug means, and between said marker control pin receptacles of said gap switch receptacle and said marker control pins of said first and second gap switch plug means for producing and storing multibit binary data indications associated with a rollalong marker switch position and two gap switch marker positions, respectively, when said plug means and said receptacles are placed in respective engagement,
time-decoding means for gating said matrix encoding and gating means in a time-dependent gating sequence so as to allow combination of said multibit data indications with separate control bits of information to form at least a magnetically recordable binary digital word.

5. The switch of claim 4 in which said R-columns of pin receptacles of said gap switch receptacle is further characterized by an S-column subgroup of pin receptacles where S is less than R,
adjacent each S-column of pin receptacles a toggle switch means includes switch contact means disconnectably connected between said S-column of pin receptacles.

6. The switch of claim 5 in which N is more than 72 but less than 312, M is 3, R is at least 72, V is more than 24 but less than 49, and S is at least 24.

7. The switch of claim 4 in which said rollalong switch receptacle includes first and second G-columnar blank pin receptacles, each located at one of the ends of said N-columns of pin receptacles, each G-column of receptacles including a pair of open-circuited connecting pins, and a marker control pin receptacle connectable to a marker connecting pin of said rollalong switch plug means through said matrix encoding and gating means.

8. The switch of claim 7 in which G is at least 24.

9. In digitizing identification codes, in binary form, on a header section of a magnetic tape to indicate absolute and relative position of a series of active geophones used in mapping, by seismic reflection techniques, an earth formation underlying said series of geophones,
a geophone position encoding switch comprising:
first receptacle means having B pairs of switch contact means adapted to be connected to said series of active geophones and B separate marker contact means having an ordered association with said B pairs of switch contact means,
first plug means having C pairs of switch contact means adapted to be closed in contact with a subgroup of said B switch contact means of said first receptacle means for the purpose of transferring, in operation, seismic signals where C is less than B, and a single marker means adapted to be closed in contact with one of said B marker contact means of said first receptacle means,
matrix encoding and gating means connected between said marker means of said first receptacle means and said first plug means for producing and storing a multibit binary indication associated with a least one marker position when said first plug means is seated in contact with said first receptacle means,
decoding means for gating said matrix encoding and gating means in a time-dependent gating sequence so as to allow combination of said multibit binary indication with separate control bits of information to form a magnetically recordable binary digital word.

10. The geophone position encoding switch of claim 9 with the addition of
a second receptacle means having C pairs of switch contact means connected to said C pairs of contact means of said first plug means, and C separate marker contact means in ordered association with said C pairs of switch contact means of said second receptacle means,
second plug means including D pairs of switch contact means where D is less than C, adapted to be closed in contact with a subgroup of said C pairs of switch contact means of said second receptacle means for the purpose of transferring, in operation, seismic energy, and at least two marker contact means adapted to be closed in contact with two of said C marker contact means of said second receptacle means, said matrix encoding and gating means being also connected between said marker means of said second receptacle means and said second plug means for simultaneously producing and storing an additional multibit binary indication that can be associated with two marker gap switch positions when said second plug means is seated in contact with said second receptacle means.

11. The switch of claim 10 in which B is about 104, C is about 72 and D is about 48.

12. A method of cyclically producing binary identification codes for recordation on a header record section of a magnetic tape to identify marker positions during a cycle of collection of seismic data, of a geophone position switch disconnectably connected to a series of active geophones during said seismic collection cycle as a source of seismic energy is cyclically energized after coordinated advancement along a line of survey of said source and said series of active geophones so as to provide, after several collection cycles, multiple subsurface coverage of semi-identical subsurface areas of an earth formation underlying said series of geophones, consisting of the steps of:
   a. prior to first initiation of said source of seismic energy producing a multibit digital data indication related to the ordered rollalong switch position of said geophone position switch during the collection cycle,
   b. storing the multibit digital data indication in a storage means,
   c. generating a time-dependent signal by means of word and block counters connected to said storage means,
   d. in response to the time-dependent signal, gating said stored digital indication and
   e. recording said multibit digital data indication as a digital word on said header record section of a magnetic tape so as to identify the rollalong switch position of said geophone position switch.

13. The method of claim 12 with the additional steps of:
   providing simultaneously with said multibit digital data indication related to said rollalong switch position, two additional multibit data indications related to gap marker switch positions of said switch during said collection cycle,
   storing said two multibit data indications and gating out said two multibit data indications simultaneously with said first-mentioned data indication so that simultaneous recordation thereof occurs.

14. The method of claim 13 with the additional steps of, after energization of said seismic source and collection of reflected seismic signals by said series of geophones and recordation, in digital form, of said signals on the data record section of said magnetic tape,
   switching from a first subgroup of said active series of geophones to a second subgroup of said geophones,
   moving said seismic source to a new source point location with respect to said second group of geophones whereby a substantial number of center points between respective geophone-source point pairs of said first group of geophones and seismic sources and between the geophone-source point pairs of said second group of said geophones and said second source point are coincident, and thereafter repeating steps (a) through (e) of claim 12.

15. The method in accordance with claim 14 in which said step of switching from a first subgroup to a second subgroup of geophones of said series of geophones includes the substeps of:
   removing a plurality of pin connectors from electrical contact with a series of receptacles connected electrically to both first and second subgroups of geophones,
   inserting said plurality of pin connectors into another series of pin receptacles thereby establishing electrical contact between said second subgroup of geophones and said plurality of pin connectors.

* * * * *

PO-1050
(5/69)

UNITED STATES PATENT OFFICE
CERTIFICATE OF CORRECTION

Patent No. 3,618,000      Dated November 2, 1971

Inventor(s) H. TOM CARRUTH, JR.

It is certified that error appears in the above-identified patent and that said Letters Patent are hereby corrected as shown below:

Title page, ABSTRACT; line 12, after "information" insert --(including one sign ($\pm$) bit)--.

Col. 1, line 28, after "information" insert --(including one sign ($\pm$) bit)--.

Col. 3, line 64, "function" should read --functional--.

Col. 4, line 2, "vibroseis" should be written in full caps, i.e., --VIBROSEIS--.

Col. 7, line 63, "21-format" should read --21-track format--.

Col. 9, line 3, "pine" should read --pin--;

line 53, after "45" insert --to cables 58--;

Col. 10, line 59, "bar through attaches" should read --bar 68 attaches--.

Col. 11, line 68, after the semi-colon, insert --and $X^0...X^4$ (representing a first gap switch position);--

Col. 12, lines 8-15, a space should appear between columns $W^1$ and $W^2$ as follows:

| | $W^0$ | $W^1$ | $W^2$ | $W^3$ | $W^4$ | $W^5$ | $W^6$ |
|---|---|---|---|---|---|---|---|
| (Binary) | 1 | 1 | 0 | 0 | 1 | 1 | 0 |
| (Decimal) | | | | 51 | | | |
| | $X^0$ | $X^1$ | $X^2$ | $X^3$ | $X^4$ | | |
| (Binary) | 1 | 0 | 0 | 0 | 0 | | |
| (Decimal) | | | 1 | | | | |
| | $Y^0$ | $Y^1$ | $Y^2$ | $Y^3$ | $Y^4$ | | |
| (Binary) | 1 | 0 | 0 | 0 | 0 | | |
| (Decimal) | | | 1 | | | | |

UNITED STATES PATENT OFFICE
CERTIFICATE OF CORRECTION

Patent No. 3,618,000  Dated November 2, 1971

Inventor(s) H. Tom Carruth, Jr.    PAGE - 2

It is certified that error appears in the above-identified patent and that said Letters Patent are hereby corrected as shown below:

Col. 14, line 68, "subgroups" should read --subgroup--.

Col. 15, line 28, "identifications" should read --identification--.

Col. 17, line 36, "digital indication" should read --digital data indication--.

Signed and sealed this 27th day of June 1972.

(SEAL)
Attest:

EDWARD M. FLETCHER, JR.          ROBERT GOTTSCHALK
Attesting Officer                Commissioner of Patents